UNITED STATES PATENT OFFICE.

WILLIAM CLARK, OF NEW YORK, N. Y.

IMPROVEMENT IN TONSORIAL COMPOUNDS.

Specification forming part of Letters Patent No. 192,565, dated July 3, 1877; application filed April 21, 1877.

*To all whom it may concern:*

Be it known that I, WILLIAM CLARK, of the city, county, and State of New York, have invented an Improvement in Tonsorial Compound, of which the following is a specification:

My invention consists in a compound for removing hairs protruding from the skin, and is formed of the ingredients hereinafter mentioned.

The constituent ingredients of this compound, properly proportioned, mixed, ground, (comminuted,) and dried, form a hard cake or tablet, which possesses the property of removing the beard or other hair from the flesh.

In preparing my improved compound I combine with each other the following ingredients, boiling the same in any manner and in any of the vessels commonly used for that purpose: To two pounds of pulverized pumice-stone (pumex) add two and one-half ounces of gum-arabic and one-eighth of one ounce of salts of tartar, (carbonate of potassium.) Mix the whole together, and boil in a quantity of water—lime-water preferred—until the compound assumes a pasty mass, which may be run, molded, or otherwise formed into cakes, which, thoroughly dried, may be gently rubbed over the parts of the flesh containing the hairs to be removed, and will thoroughly rid the skin of all projecting hairs, and leave the same smooth and soft.

I do not limit myself to the exact proportions stated, as they may be varied considerably without departing from my invention; and the said component parts may be combined with each other in any order which experience may suggest, and a little coloring-matter, as cochineal, may be used.

The base—pumice-stone, (pumex)—may be bound together by other material than gum-arabic, such, for instance, as glue, isinglass, &c. Moreover, the salts of tartar may be substituted by an equivalent alkali, as potash, (oxide of potassium.)

What, therefore, is claimed is—

As a new article of manufacture, a tablet or cake composed of pumice-stone, alkaline salt, and a mucilaginous binding material, combined substantially in the proportions and as hereinbefore specified.

In testimony whereof I have signed my name to this specification in the presence of two subscribing witnesses.

WILLIAM CLARK.

Witnesses:
H. T. MUNSON,
JOHN C. KLUBER.